US006716074B2

(12) United States Patent
Coulombe

(10) Patent No.: US 6,716,074 B2
(45) Date of Patent: Apr. 6, 2004

(54) MAGNETIC DIFFERENTIAL DISPLACEMENT DEVICE WITH DISTRIBUTING FORCES PENDULUM ARRAY

(76) Inventor: Maurice Coulombe, 4296 Place Charles Bédard, Charlesbourg (Québec) (CA), G1H 5L9

( * ) Notice: Subject to any disclaimer, the term of this patent is extended or adjusted under 35 U.S.C. 154(b) by 121 days.

(21) Appl. No.: 09/993,800

(22) Filed: Nov. 28, 2001

(65) Prior Publication Data

US 2002/0063480 A1 May 30, 2002

Related U.S. Application Data

(60) Provisional application No. 60/253,986, filed on Nov. 30, 2000.

(51) Int. Cl.[7] .......................... B63H 21/17; H02K 33/04
(52) U.S. Cl. .............................. 440/6; 440/113; 310/20; 310/75 R; 310/80
(58) Field of Search ............................. 310/12–14, 273, 310/20, 80, 75 R, 74; 440/6, 113

(56) References Cited

U.S. PATENT DOCUMENTS

| 4,151,431 A | 4/1979 | Johnson |
| 4,305,448 A | 12/1981 | Stoll |
| 4,488,477 A | 12/1984 | Miyamoto |
| 4,754,691 A | 7/1988 | Rogerson |
| 4,876,945 A | 10/1989 | Stoll et al. |
| 4,889,035 A | 12/1989 | Goodnow |

OTHER PUBLICATIONS

Meriam, James L., Engineering mechanics (vol. 2) Dynamics, 1980, John Wiely & Sons, Inc., p. 6.*

* cited by examiner

Primary Examiner—Burton S. Mullins
Assistant Examiner—David W. Scheuermann
(74) Attorney, Agent, or Firm—François Martineau

(57) ABSTRACT

A differential displacement electromagnetic device providing forward thrust over water of a watercraft. This electromagnetic device includes an elongated rigid rail member anchored against the watercraft bilge, a first magnet module, slidingly carried by one end portion of the rail member, and a second magnet module, slidingly carried by another end portion of the rail member. The second module has the same mass as the first module but has a pivot mount at a central portion thereof. A pair of elongated rigid arms are pivotally mounted at their inner ends to the second module member pivot mount, while a pair of electromagnets are fixedly mounted to corresponding outer ends of the rigid arms. An electric battery generates an electromagnetic field of force about the magnets and electromagnets, such that upon energizing the battery, magnetic repulsive sliding displacement of both modules occurs, wherein the speed achieved by the second module is greater than that of the first block so that forward thrust of the watercraft over water may occur.

5 Claims, 3 Drawing Sheets

MAGNETIC DIFFERENTIAL DISPLACEMENT DEVICE WITH DISTRIBUTING FORCES PENDULUM ARRAY

CROSS-REFERENCE DATA

This application claims convention priority based upon provisional patent application No. U.S. 60/253,986 filed Nov. 30, 2000.

FIELD OF THE INVENTION

This invention relates to electromagnets, in particular electromagnets for displacement in space of physical bodies.

BACKGROUND OF THE INVENTION

In watercrafts, a substantial amount of the energy required for forward thrust (e.g. with rearwardly located blade impellers) thereof is wasted due to drag-induced frictional forces, and in particular from the underlying body of water on the watercraft hull. Alternate methods of imparting thrust to a watercraft in a way that would reduce drag, would be welcome.

Sailboats tend to be more efficient than powerboats, but they depend upon the whims of the wind, so they cannot be relied upon to go from A to B in a set time. Hydrofoils or hovercrafts are also quite efficient, but are very noisy and their distribution has always remain quite limited because of their inherent technical limitations.

Use of electromagnets in transport has been demonstrated with so-called "maglev" trains tested in Japan, where the trains levitate at a very low altitude over the rail again to reduce frictional forces. However, these magnetic levitation trains remain for the time being mainly experimental, due to several major as yet unsolved technical challenges.

A magnet is a body that attracts iron and certain other material, by virtue of a surrounding field of force produced by the motion of its atomic electrons and the alignment of its atoms. An electromagnet, in turn, is a magnet (consisting essentially of a soft-iron core) wound with a current-carrying coil of insulated wire, the current in which produces the magnetization of the core. Accordingly, the electromagnet generates an electromagnetic field of force associated with an accelerating electric charge, having both electric and magnetic components and containing a definite amount of electromagnetic energy.

OBJECT OF THE INVENTION

The gist of the present invention is therefore to provide an electromagnetic device for providing motion and/or thrust to a watercraft.

SUMMARY OF THE INVENTION

In accordance with the object of the invention, there is disclosed a device for enabling magnetic repulsive sliding displacement of two same-mass mobile blocks, where one block moves farther away than the other block relative to an intermediate point of reference. The blocks are connected to an intermediate stationary frame. Electrical current is applied on electromagnets pivotally mounted on one block, so that repulsive magnetic forces be applied between the two blocks.

More particularly, the invention relates to a differential displacement electromagnetic device for providing motion over water of a watercraft, said electromagnetic device including: a) an elongated rigid rail member, to be anchored into the watercraft against the watercraft bilge, said rail member having one and another opposite end portion, and a stopper member anchored at an intermediate middle section thereof; b) a first module member, slidingly carried by said rail member at said one end portion thereof, c) a second module member, slidingly carried by said rail member at said another end portion thereof, said second module member being of same mass as said first module member but having a pivot mount at a central portion thereof; each of said first and second module member being magnetized; d) a biasing member, biasing said first and second module member toward one another, said first and second module member abutting against said stopper member under bias of said biasing member when said electromagnetic device is at rest; e) a pair of elongated rigid arms, each having an inner end, pivotally mounted to said second module member pivot end, and an outer end; f) a pair of electromagnets, each of said electromagnets fixedly mounted to a corresponding one of said rigid arms outer end; and g) a power source, operatively connected to said first module member and second module member for generating an electromagnetic field of force about said magnets and said electromagnets; wherein upon energizing said power source, magnetic repulsive sliding displacement of both said first and second module member occurs against the bias of said biasing member wherein said second module member travels by a longer distance along said rail relative to said first module member, and wherein upon de-energizing said power source, said first and second module member move toward one another and said first module member strikes said stopper member before said second module member, so that motion of the watercraft over water may occur.

Preferably, each of said first and second module member further includes a notch facing said stopper member, said notch of complementary shape to a registering portion of said stopper member, both such notches being engaged by said stopper member when said electromagnetic device is at rest.

The invention also relates to a a powered watercraft comprising a hull including a bow section, a stem section opposite said bow section, and a bilge intermediate said bow section and said stern section, and a differential displacement electromagnetic device for providing motion over water of said watercraft, said electromagnetic device including: a) an elongated rigid rail member, anchored into the watercraft against the watercraft bilge, said rail member having one and another opposite end portion and a stopper member at an intermediate middle section thereof, b) a first module member, slidingly carried by said rail member at said one end portion thereof, c) a second module member, slidingly carried by said rail member at said another end portion thereof, said second module member being of same mass as said first module member but having a pivot mount at a central portion thereof, each of said first and second module member being magnetized; d) a biasing member, biasing said first and second module member toward one another, said first and second module member abutting against said stopper member under bias of said biasing member when said electromagnetic device is at rest; e) a pair of elongated rigid arms, each having an inner end, pivotally mounted to said second module member pivot mount, and an outer end; f) a pair of electromagnets, each of said electromagnets fixedly mounted to a corresponding one of said rigid arms outer end; and g) a power source, operatively connected to said first module member and second module member for generating an electromagnetic field of force about said magnets and said electromagnets; wherein upon energizing said power source, magnetic repulsive sliding displacement of both said first and second module member occurs, against the bias of said biasing member wherein said second module member travels by a longer distance along said rail relative to said first module member, and wherein upon release of said energizing of said power source, said first and second module member move toward one another and said first module member strikes said stopper member before said second module member, so that said watercraft is provided with motion over water.

A CPU may be added, being operatively connected to said power source and to said first and second module member, wherein there are at least two laterally spaced said electromagnetic device, and wherein said motion over water of said watercraft consists of steerable forward bow section thrust.

DETAILED DESCRIPTION OF THE PREFERRED EMBODIMENT OF THE INVENTION

Figure 1:
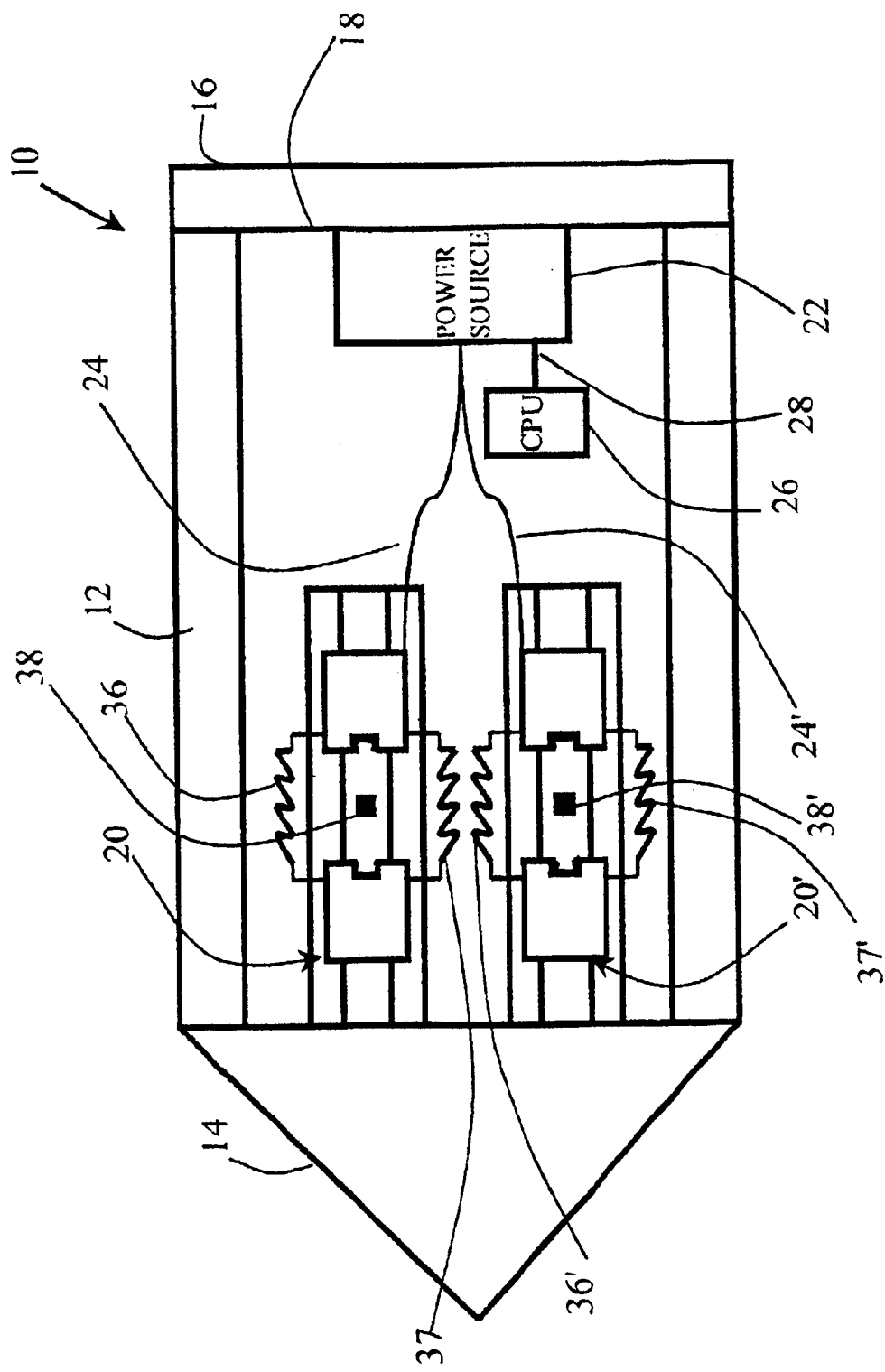
FIG. 1 is a schematic top plan view of a watercraft, with the electromagnetic device of the invention and associated power source fitted against the bilge thereof.

FIG. 1 shows a watercraft 10 having a hull 12 including a tapered bow section 14, a rounded stern section 16 opposite the bow section 14, and a bilge 18 intermediate the bow section 14 and the stern section. A pair of differential displacement electromagnetic devices 20, 20', are spacedly mounted to the watercraft bilge 18, inside the watercraft 10. A power source 22—such as an electric generator or a battery—is also anchored to the watercraft bilge 18, and is connected to the electromagnetic devices 20, 20', by electric lines 24, 24'. A central processing unit or CPU 26, is operatively connected by electric line 28 to power source 22 and to electromagnetic devices 20, 20', by lines 24, 24', respectively.

Figure 2:
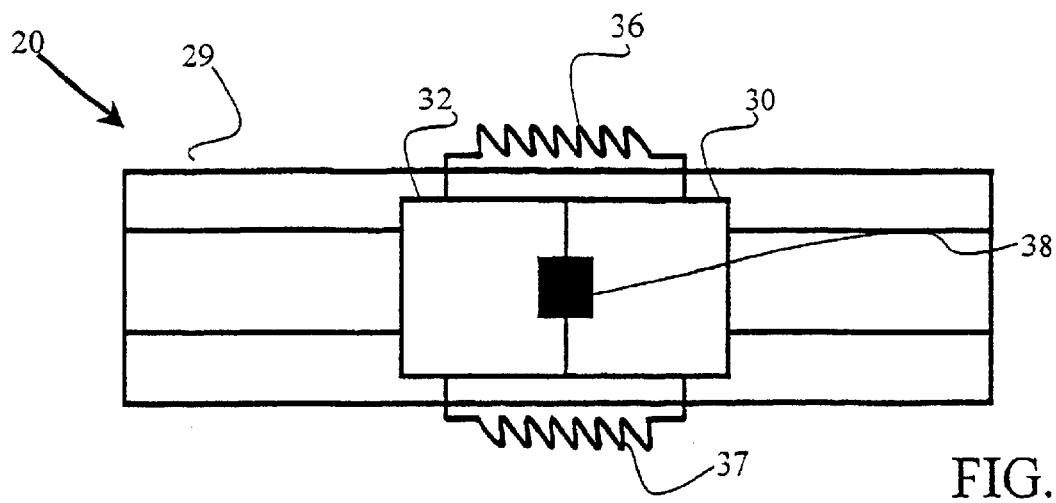
FIGS. 2, 3 and 4 are enlarged schematic top plan views of the electromagnetic device of the present invention, sequentially suggesting how the pair of magnetized modules move away from one another against the bias of the biasing springs and under the bias of an electromagnetic field.

As illustrated in FIG. 2 of the drawings, each electromagnetic device 20 consists of an elongated rigid rail member 29 anchored to the watercraft bilge 18 in fore and aft extending fashion. A pair of modular blocks 30, 32, are slidably carried by rail 29 for coaxial sliding motion thereof along rail 29. Blocks 30, 32, each includes an integral magnet embedded therein. Blocks 30, 32, each has the same mass than the other.

A stopper member or post 38 is anchored to an intermediate section of each rail 29, at the middle point between the two opposite ends of the rail 29. A pair of tension coil springs 36, 37, interconnect the movable blocks 30 and 32, and constitute a biasing member biasing these blocks 30, 32 toward one another and against the central post 38. Preferably, each slidable block 30, 32, includes a notch 30*a*, 32*a*, for complementary engagement around a registering half section of post 38 when blocks 30, 32 abut against one another under the bias of their tension springs 36, 37. Post 38 may be square in cross section, as illustrated, or circular in cross section, or other suitable forms.

At rest or equilibrium, i.e. when no magnetic field is applied, the two movable modules 30, 32, abut against one another around the central post 38, over their common elongated rail 29, as illustrated in FIG. 2. Under the impulse of the electromagnetic field, modular blocks 30, 32, move repulsively away from one another, against the bias of their tension springs 36, 37. Without the differential displacement system 20 of the present invention, these same-mass blocks 30, 32, would move away from one another by the same relative distance. However, with the present differential displacement system, one block 30 moves farther away than the other block 32 (FIG. 3).

Figure 5:
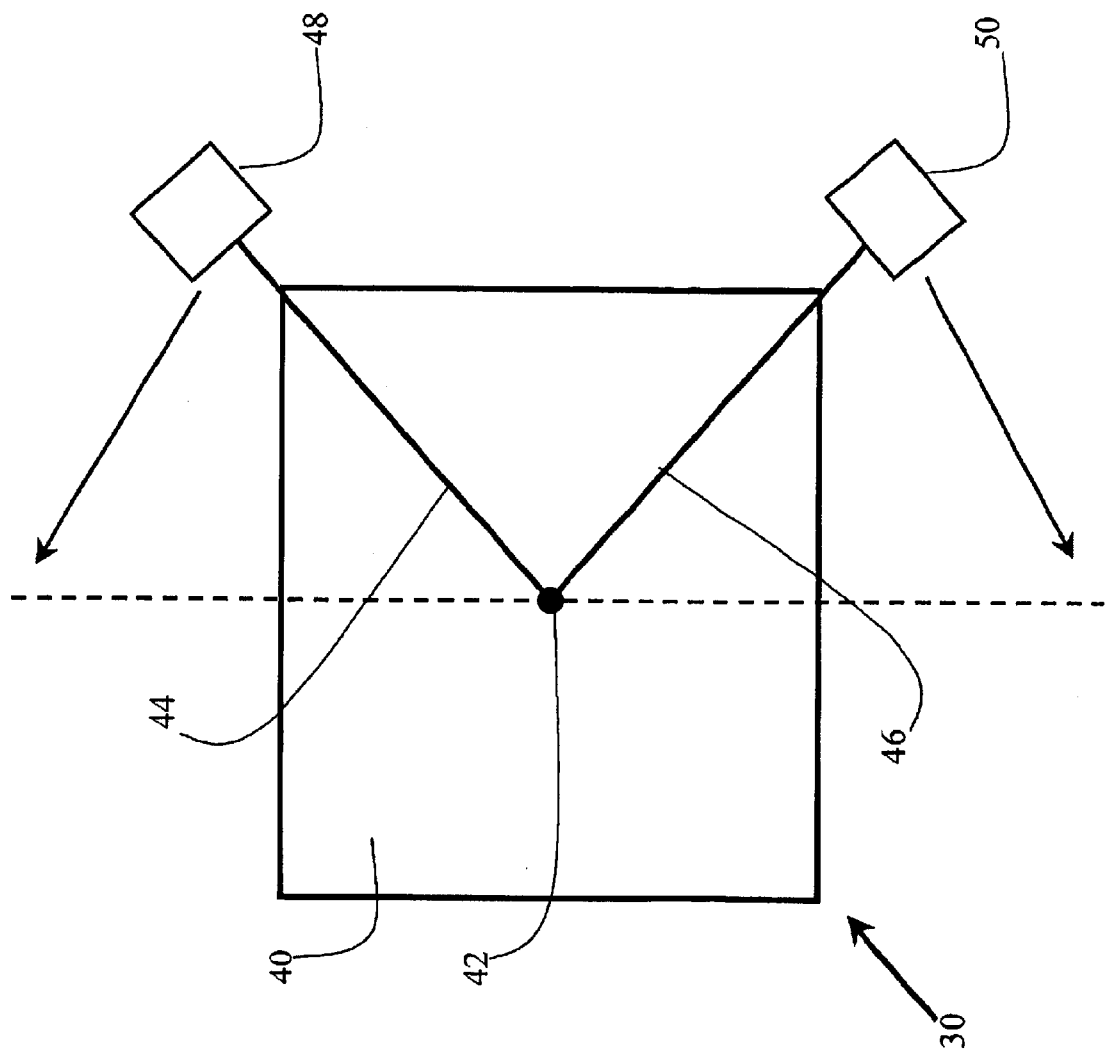
FIG. 5 is a schematic view of one of these modules, showing the two pivotal arms and end weights pivotally mounted to this module.

FIG. 5 shows the slidable module block 30. Block 30 includes a main body 40 having a pivot mount 42 at a centre portion thereof. Two elongated rigid arms 44, 46, are pivotally mounted at their inner ends to the same pivot mount 42. To the outer end of each rigid arm 44, 46, is fixedly secured an electromagnet 48, 50.

Figure 3:
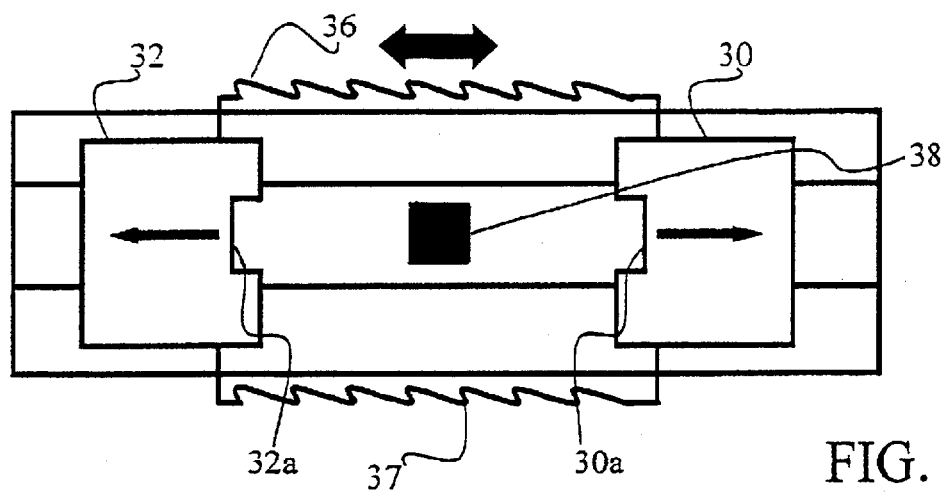

FIG. 3 suggested that, under an applied electromagnetic field, when the differential displacement system is applied onto the movable blocks 30, 32, the pairs of pivotal magnets 48, 50, travel divergingly away from their stationary pivotal mount 42 on the given movable block 30, so that block 30 travels over rail 29 by a distance greater than the other movable block 32. Consequently, the resultant vector of displacement of the second movable block 30—which is coaxially of but in the opposite direction of displacement from the first movable block 32—produces a greater speed, which means a greater displacement relative to the first block, as clearly shown in FIG. 3.

Figure 4:
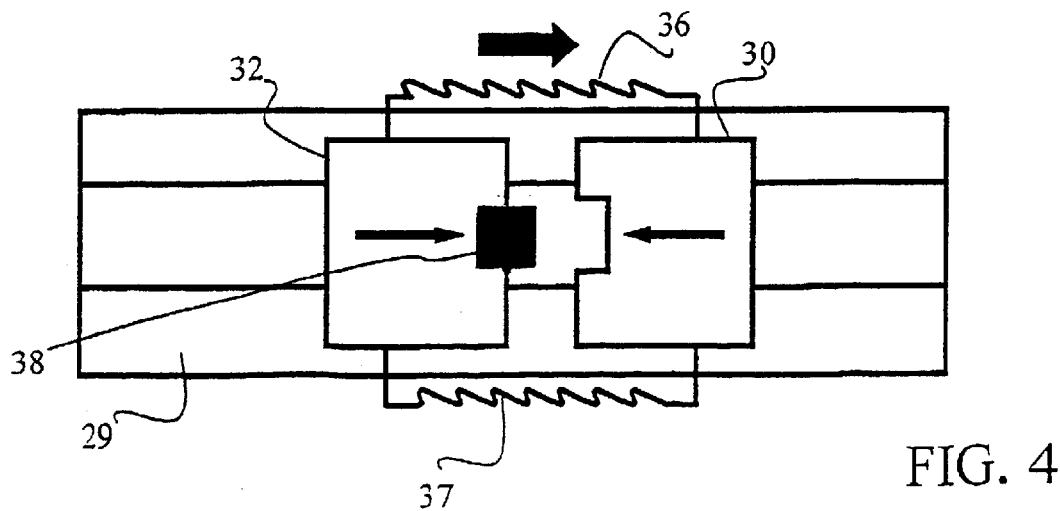

FIG. 4 shows the moment when the electromagnetic field is de-energized, which enable both tension springs 36, 37, to pull back both modular blocks 30, 32, toward one another against the centre post 38. As both modules 30, 32, are moving at the same speed, the module 32 which is closer to the centre post 38 will strike on post 38 before block 30, and thus module 32 gives an impulsion to the rail 29 before module 30 reaches the centre post 38.

According to one embodiment of the present differential displacement device, the differential displacement observed between the two modules 30 and 32, was for example of the order of between 30% and 40% in travel speed.

The present differential displacement device can be applied to a machine or a vehicle, but preferably a watercraft 10, that uses a differential acceleration of two modules of same mass, in view of obtaining a net external force in a closed loop system.

Within a watercraft 10, the present electromagnetic device 20, when anchored to the watercraft bilge 18, does generate motion of watercraft 10 over water. When two or more such electromagnetic devices are mounted into the watercraft, steerable forward thrust of the watercraft 10 can be obtained, without any need for a watercraft rudder or impeller externally engaging directly with the body of water supporting the watercraft. Such forward thrust of the watercraft 10 is enabled by the electromagnetic devices 20, and steerable forward thrust thereof is controlled by coordination of the travel of oscillating modular members 30, 32 via the CPU 26.

In a motor vehicle (not shown) for use on a road, the present differential displacement device could be use to dampen the centrifugal forces applied to the motor vehicle when the motor vehicle engages with speed into curbs. This differential acceleration is borne by a pair of electromagnets pivotally mounted to one of the movable modules for acceleration in a direction arcuately transverse to that of the displacement of the movable modules, so that one module moves faster than the other for a same force applied to both modules and even though both modules have the same mass.

I claim:

1. A differential displacement electromagnetic device for providing motion over water of a watercraft, said electromagnetic device including:
   a) an elongated rigid rail member, to be anchored into the watercraft against the watercraft bilge, said rail member having one and another opposite end portion, and a stopper member anchored at an intermediate middle section thereof;
   b) a first module member, slidingly carried by said rail member at said one end portion thereof;
   c) a second module member, slidingly carried by said rail member at said another end portion thereof, said second module member being of same mass as said first module member but having a pivot mount at a central portion thereof;

each of said first and second module member being magnetized;

d) a biasing member, biasing said first and second module member toward one another, said first and second module member abutting against said stopper member under bias of said biasing member when said electromagnetic device is at rest;
   e) a pair of elongated rigid arms, each having an inner end, pivotally mounted to said second module member pivot mount, and an outer end;
   f) a pair of electromagnets, each of said electromagnets fixedly mounted to a corresponding one of said rigid arms outer end; and
   g) a power source, operatively connected to said first module member and second module member for generating an electromagnetic field of force about said magnets and said electromagnets;

wherein upon energizing said power source, magnetic repulsive sliding displacement of both said first and second module member occurs against the bias of said biasing member wherein said second module member travels by a longer distance along said rail relative to said first module member, and wherein upon de-energizing said power source, said first and second module member move toward one another and said first module member strikes said stopper member before said second module member, so that motion of the watercraft over water may occur.

2. An electromagnetic device as in claim 1, wherein each of said first and second module member further includes a notch facing said stopper member, said notch of complementary shape to a registering portion of said stopper member, both such notches being engaged by said stopper member when said electromagnetic device is at rest.

3. A powered watercraft comprising a hull including a bow section, a stem section opposite said bow section, and a bilge intermediate said bow section and said stem section, and a differential displacement electromagnetic device for providing motion over water of said watercraft, said electromagnetic device including:
   a) an elongated rigid rail member, anchored into the watercraft against the watercraft bilge, said rail member having one and another opposite end portion and a stopper member at an intermediate middle section thereof;
   b) a first module member, slidingly carried by said rail member at said one end portion thereof;
   c) a second module member, slidingly carried by said rail member at said another end portion thereof, said second module member being of same mass as said first module member but having a pivot mount at a central portion thereof;

each of said first and second module member being magnetized;

d) a biasing member, biasing said first and second module member toward one another, said first and second module member abutting against said stopper member under bias of said biasing member when said electromagnetic device is at rest;
   e) a pair of elongated rigid arms, each having an inner end, pivotally mounted to said second module member pivot mount, and an outer end;
   f) a pair of electromagnets, each of said electromagnets fixedly mounted to a corresponding one of said rigid arms outer end; and
   g) a power source, operatively connected to said first module member and second module member for generating an electromagnetic field of force about said magnets and said electromagnets;

wherein upon energizing said power source, magnetic repulsive sliding displacement of both said first and second module member occurs, against the bias of said biasing member wherein said second module member travels by a longer distance along said rail relative to said first module member, and wherein upon release of said energizing of said power source, said first and second module member move toward one another and said first module member strikes said stopper member before said second module member, so that said watercraft is provided with motion over water.

4. A powered watercraft as in claim 3, further including a CPU, operatively connected to said power source and to said first and second module member, wherein there are at least two laterally spaced said electromagnetic device, and wherein said motion over water of said watercraft consists of steerable forward bow section thrust.

5. A powered watercraft as in claim 3, wherein each of said first and second module member further includes a notch facing said stopper member, said notch of complementary shape to a registering portion of said stopper member, both such notches being engaged by said stopper member when said electromagnetic device is at rest.

* * * * *